Sept. 29, 1942. K. SCHILD 2,297,251
DEVICE FOR MEASURING DISPLACEMENTS WITH CARRIER FREQUENCY
Filed June 16, 1938 2 Sheets-Sheet 1

Inventor:
Karl Schild
By A. D. Adams
Attorney

Patented Sept. 29, 1942

2,297,251

UNITED STATES PATENT OFFICE 2,297,251

DEVICE FOR MEASURING DISPLACEMENTS WITH CARRIER FREQUENCY

Karl Schild, Berlin-Tempelhof, Germany; vested in the Alien Property Custodian

Application June 16, 1938, Serial No. 214,130
In Germany June 21, 1937

6 Claims. (Cl. 177—352)

The invention relates to a device for measuring displacements, for instance a vibrograph, an extension-meter, or the like with carrier frequency or waves, in which, as is well-known, an armature arranged in front of the poles of a magnetic system adjusts or displaces itself in accordance with the measuring forces, effecting it from outside, from or to the poles and therefore effects a modulation of the carrier frequency.

In the displacement meters known up to now of the described type an alternate current generator (motor or tube generator), being outside of the instrument, supplies the alternate current as carrier frequency which is conducted into the displacement-meter and is modulated there. Such arrangements result in many difficulties and disadvantages. Thus, for instance, it is difficult to generate by means of a motor generator an alternate current which is free from undesirable modulation due to for instance unbalance of the motor. On the other hand when using several displacement-meters if one connects these to the same generator, then the danger exists that when the carrier frequency of the motor generator is influenced by one displacement-meter the amplitude of the carrier frequency for the other displacement-meters varies in the same manner and therefore the indications of all displacement-meters influence one another. Furthermore, the entire arrangement is very large and bulky and therefore difficult to transport and install.

Figure 1:
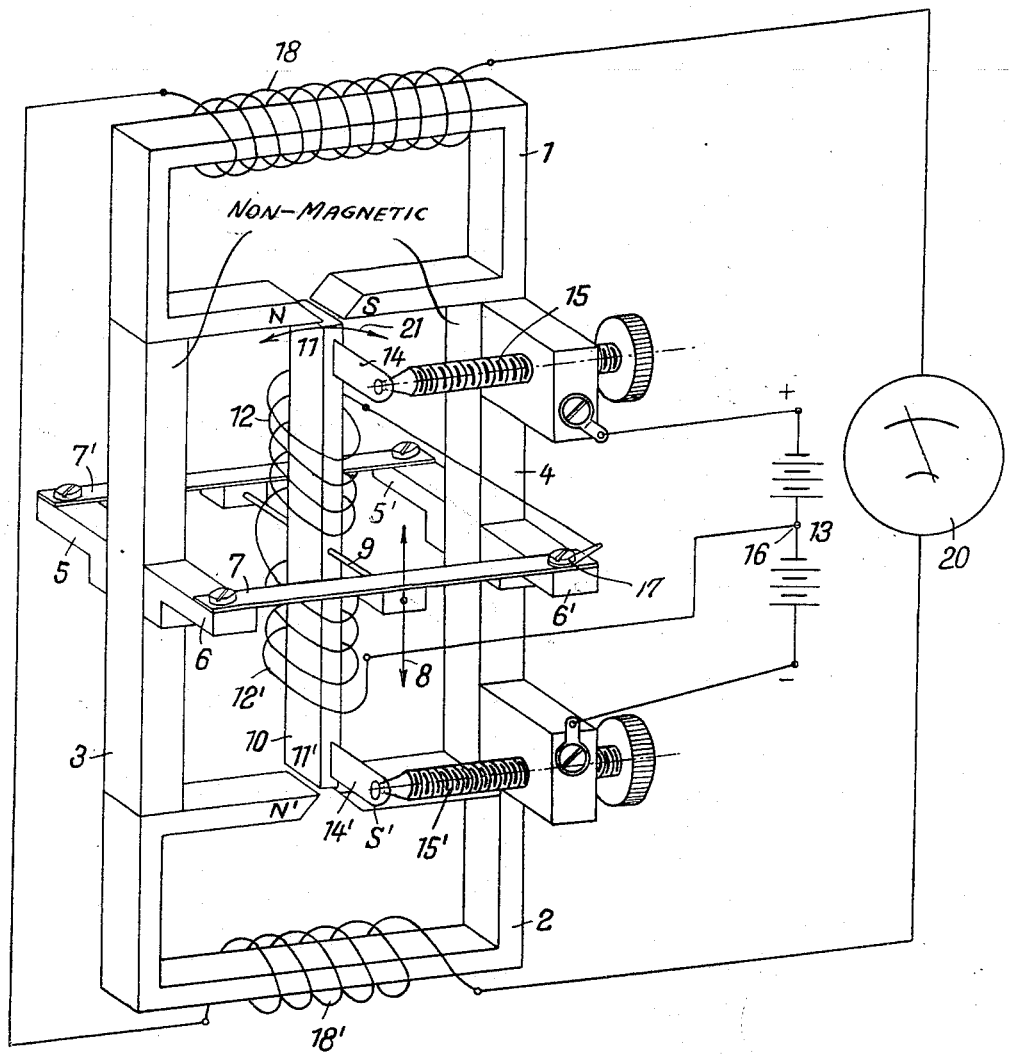
Figure 2:
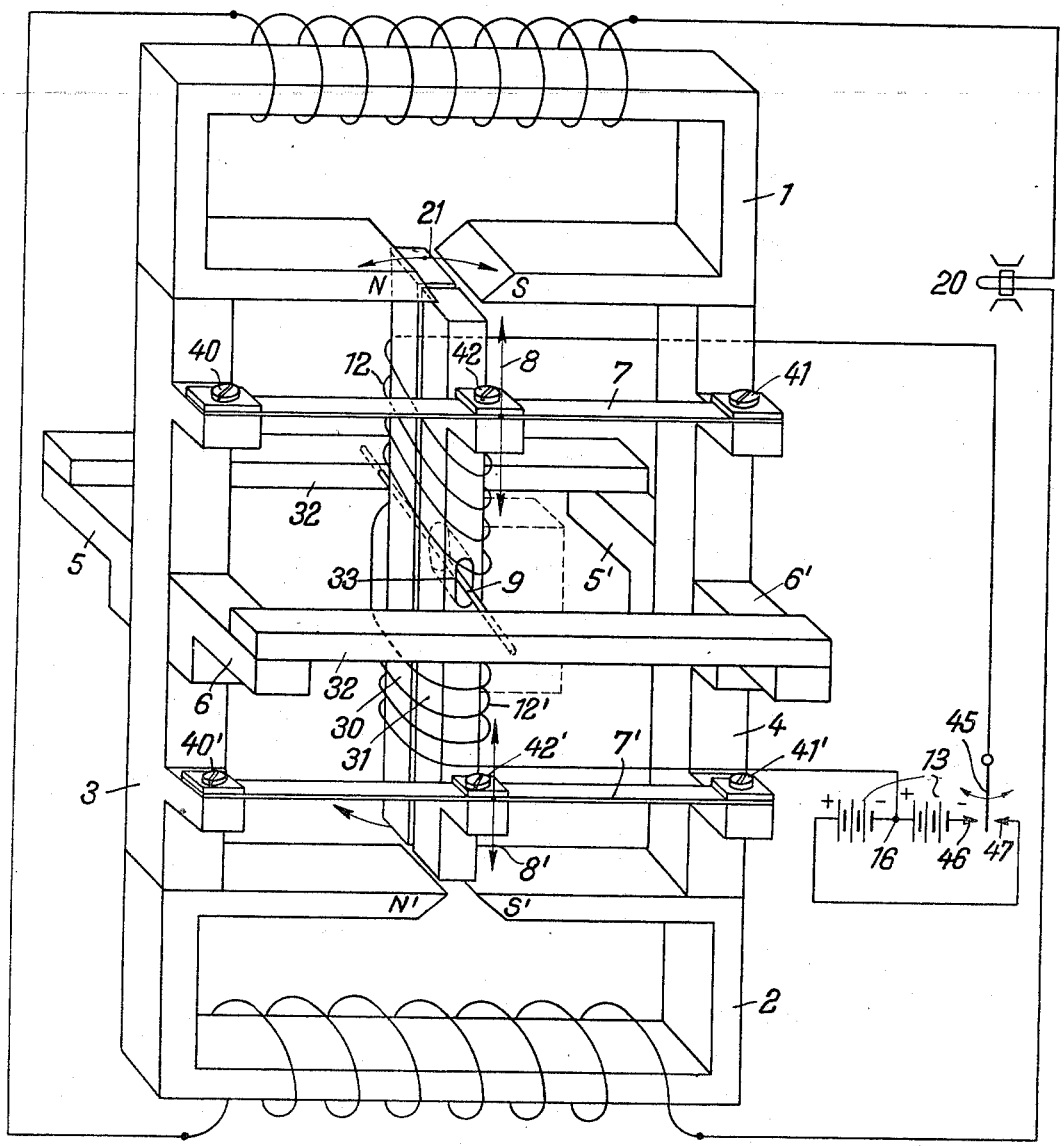

These described disadvantages may be removed by using an apparatus as described in the following specification and accompanying drawings. Fig. 1 is a perspective view of one embodiment of the invention Fig. 2 showing a modification of the device according to Fig. 1. In Fig. 1 two magnets 1 and 2 which are formed by a nearly closed iron core and have tapered poles as illustrated in the drawings are attached to two non-magnetic supporting members 3 and 4. These magnets may be permanent magnets as illustrated in the drawings or electro magnets. To said members are secured supports 5 and 5', 6 and 6' in such a manner that the leaf spring 7 attached to the supports 6, 6' may be bent in direction of the arrow 8, a second leaf spring 7' is attached in like manner to the supports 5 and 5' with the same result. The ends of a torsion thread or filament 9, perpendicularly to the leaf springs, are held in the middle of said leaf springs; said thread or filament supports an armature 10 of soft iron in such a manner that said thread passes through the center of gravity of the armature so as to enable the armature 10 to oscillate around the torsion thread. The ends 11 and 11' of the armature 10 extend nearly up to the poles N, S and N', S' of the magnetic systems 1 and 2, respectively, and thus form magnetic bridges with respect to the air gap. On one hand, if the armature 10 is set in oscillation, its ends may oscillate in front of the poles in direction of the arrow 21, on the other hand the distance between the ends of the armature and the poles may be varied under the influence of forces which are to be measured and which act upon the middle of the leaf springs 7, 7' in direction of the arrow 8. Coils 12, 12' are provided which surround one end of the armature 10, respectively; these coils being carried either by the armature, the supporting members, or the leaf springs. Through these coils current impulses of varying direction—for the purpose of alternatively magnetizing the armature 10 so that the ends of said armature oscillate in front of the poles—are sent in the following manner: a direct current source 13 creates current impulses which are sent through the coils in variable direction by means of interrupters. Referring to the drawings the ends 11 and 11' of the armature 10 are provided with conducting members 14 and 14', respectively. Said members cooperate with fixed conducting members, adjustable screws for example, 15, 15', respectively, thus forming contacts. The conducting member 15 is connected to the positive pole of the direct current source 13, whilst the other conducting member 15' is connected in like manner to the negative pole. The middle 16 of the direct current source 13 is joined to the one end of the coil 12' which is connected in series with the coil 12 whose other end is attached to one end of the leaf spring 7 by means of a screw 17. The leaf spring 7, the torsion thread 9, and the armature 10 act as conducting members for carrying the current from the screw 17 to either the conducting member 14 or 14'. The two contacts are so constructed that if the armature swings clockwise, the upper contact is closed and the lower contact is opened, whilst if the armature swings counterclockwise the upper contact is opened and the lower contact is closed. The magnetic systems 1 and 2 carry coils 18 and 18' in which alternate current, being the carrier frequency, is created by movements of the armature 10.

The device operates as follows: Assuming now that no forces are tending to displace the armature 10 in direction to or from the poles of the magnetic systems 1 and 2 and the armature is in one of its end positions in which for example the contact 14, 15 is closed, whilst the contact 14', 15' is opened, then the current flows from the positive pole of the current source 13 over the contact 14, 15, the armature 10, the torsion thread 9, the leaf spring 7 to the screw 17 and from there through the coils 12, 12' to the middle 16 of the current source 13. As a result of this the armature 10 is magnetized in such manner that it moves from this end position to the other end position, in which the contact 15, 14 is interrupted and the contact 15', 14' is closed. The current then flows from the middle 16 of the current source 13 through the coil 12', 12 to the screw 17 and from there through the leaf spring 7, the torsion thread 9, the armature 10, and the contact 14', 15' to the negative pole of the current source 13. The armature 10 is therefore magnetized in the other direction, thereby resulting in periodic oscillation of the armature 10. During one period of oscillation of the armature 10, the magnetic resistance between the poles varies gradually from a minimum, occurring in the middle position of the armature 10, to a maximum, occurring in an end position of said armature, and then back to a minimum; the same result being obtained when the armature swings to its other end position and back. Accordingly, the magnetic fluctuations of each of the magnetic systems 1 and 2 vary; these fluctuations induce thereby in the coils 18 and 18' surrounding the iron core of the magnetic systems 1 and 2, respectively, alternating electromotive forces of relative high cycles per second and equal in their amplitude, thereby producing a carrier frequency. The one ends of these coils are connected together and the other ends to the indicating instrument 20 in such manner that the electro-motive forces act against one another. As no forces are acting upon the leaf springs the indication of the measuring instrument 20 is always zero.

If, however, the leaf springs 7 and 7' are bent upwards or downwards by forces due to the displacement which is to be measured, then the armature 10 is moved to the poles of one magnetic system and away from the poles of the other system and the mean value which varies periodically from a maximum to a minimum and back of the magnetic fluctuation of the one system increases and of the other decreases, i. e., the carrier frequency of the coils 18 and 18' is modulated so that the amplitude of the carrier frequency in the one coil decreases and in the other increases. Now the difference in the amplitude of the carrier frequency is indicated by the indicating instrument 20. The leaf spring 7, 7' can be moved either in dependence on an extension or in dependence on a vibration.

Contrary to the well-known device of this type according to the invention the carrier frequency is generated as described above within the instrument. Instead of using an armature which on the one hand is displaced in direction from or to the poles by the influences of the forces to be measured and on the other hand by additional forces around an axis passing preferably through its center of gravity, one can use according to Fig. 2 two armatures 30, 31 of which one (30) only oscillates in front of the poles of the magnetic systems 1, 2 in order to generate the carrier frequency and the other (31) is only displaced in direction from or to the poles in dependence on the forces to be measured, thereby modulating the carrier frequency.

For this purpose only the armature 30 is held by the torsion thread filament 9, the ends of which are secured to the rigid members 32, 32 which are carried by the supports 6, 6', 5, 5', respectively so as to enable oscillations of the armature 30 in front of the poles N, S, N', S', respectively, as indicated by the arrow 21. The other armature, 31, is arranged parallel to the armature 30 and has a bore 33, through which the torsion thread passes, the bore being relatively large in comparison with the diameter of thread 9 thereby making possible displacements of the armature 31 relative to the thread 9. The armature 31 is mounted for rectilinear movement relative to the poles N, S, N', S', respectively, by means of flat springs 7, 7' whose ends are secured to the supporting members 3, 4 by means of screws 40, 41 and screws 40', 41', so that the flat springs 7, 7' may be bent in direction of the arrows 8, 8', and whose middle portions are fastened to an end of the armature 31 by means of screws 42, 42'. Series connected coils 12, 12' are provided which surround the ends of both armatures and are fed by current impulses of varying direction thereby alternately magnetizing the ends of the armature 30 and setting this armature into oscillation. These coils may be carried by the supporting members 3, 4. The outer end of coil 12' is connected to the middle 16 of the storage battery 13, while the outer end of the coil 12 is connected to an oscillating contact 45 of an automatically driven interrupter of any convenient type, one end of the battery 13 being connected to the contact 46 of the interrupter, the other end of the battery being connected to the contact 47 of the interrupter so that the oscillating contact 45 may alternately touch the contacts 46, 47 thereby creating direct current impulses of varying direction. The remaining construction of the device is the same as illustrated in Fig. 1.

For changing the sensitivity of the measuring device either the entire mass of the movable members supported by the leaf springs may be varied or the force of the springs (leaf springs 7 and 7') against which the movable system is displaced.

The mass may be varied for instance by securing additional weights to the middle of the leaf springs or, as is indicated in Fig. 2 by dotted lines, by securing an additional mass to the middle part of the armature 31 which is mounted for rectilinear movement and the force of the leaf springs may be varied by tightening same or exchanging same for leaf springs of a different force.

It is to be noted that the present invention is not restricted to the particular embodiment shown and described. Many other modifications besides those explained above may be made without departing from the spirit of the invention, the particulars of which are defined in the following claims.

What is claimed is:

1. A device for producing alternating current and for modulating alternating current upon displacements to be measured, comprising at least one magnetic circuit consisting of a magnet having confronting pole faces of opposite magnetic polarities separated by a constant air gap, an armature movably mounted near said air gap so as to act as a magnetic bridge for the magnetic flux of said magnet, means for continuously oscillating said armature at a constant speed so as to periodically reduce its distance from either of the confronting pole faces while simultaneously increasing its distance from the other thereby producing periodic variations of constant frequency and amplitude in the magnetic resistance of said circuit, an induction coil arranged in the magnetic field of said circuit so that an alternating voltage is generated in said coil by the periodically changing magnetic flux, means for additionally varying the magnetic conductivity of said air gap in response to the displacement to be measured, thereby producing modulations of said alternating voltage, an electro-motive force responsive means, and connecting means between said coil and said electro-motive force responsive means.

2. A device for producing alternating current and for modulating alternating current upon displacements to be measured, comprising at least one magnetic circuit consisting of a magnet having confronting pole faces of opposite magnetic polarities separated by a constant air gap, an armature movably mounted near said air gap so as to act as a magnetic bridge for the magnetic flux of said magnet, means for continuously oscillating said armature at a constant speed comprising an electric coil surrounding the armature, a direct current source supplying said coil with electric energy and means for periodically changing in said coil the direction of flow of the current supplied by said current source thereby alternately magnetising said armature whereby the one end of the armature next to the air gap is alternately attracted by the one pole or the other pole of the magnet, an induction coil arranged in the magnetic field of said magnetic circuit so that an alternating voltage is generated in said coil by the periodically changing magnetic flux, means for additionally varying the magnetic conductivity of said air gap in response to the displacement to be measured, thereby producing modulations of said alternating voltage, an electro-motive force responsive means, and connecting means between said induction coil and said electro-motive force responsive means.

3. A device for producing alternating current and for modulating alternating current upon displacements to be measured, comprising at least one magnetic circuit consisting of a magnet having confronting pole faces of opposite magnetic polarities separated by a constant air gap, an armature being movably mounted near said air gap so as to act as a magnetic bridge for the magnetic flux of said magnet, means for continuously oscillating said armature at a constant speed so as to periodically reduce its distance from either of the confronting pole faces while thereby producing periodic variations of constant frequency and amplitude in the magnetic resistance of said circuit, an induction coil arranged in the magnetic field of said circuit so that an alternating voltage is generated in said coil by the periodically changing magnetic flux, means for producing a translational movement of said armature relative to said air gap in dependence on the displacement to be measured and additional to said oscillating movement to additionally vary the magnetic conductivity of the air gap thereby producing modulations of said alternating voltage, an electro-motive force responsive means, and connecting means between said coil and said electro-motive force responsive means.

4. A device according to claim 2, in which said means periodically changing the direction of flow of the current supplied by the direct current source in said coil surrounding said armature are connected to the armature.

5. A device according to claim 3, wherein a torsion thread and leaf springs are provided, said armature being supported for oscillation by means of the torsion thread and said torsion thread being supported by the plurality of leaf springs flexible in the same direction for enabling the armature to effect a translational movement relative to said air gap in dependence on the displacement to be measured.

6. A device for producing alternating current and for modulating alternating current upon displacements to be measured, comprising at least one magnetic circuit consisting of a magnet having confronting pole faces of opposite magnetic polarities separated by a constant air gap, an armature rotatably mounted on an axle passing through its center of gravity, one end of said armature being arranged near said air gap to act as a magnetic bridge for the flux of said magnet, means for continuously oscillating said armature at a constant speed comprising an electric coil surrounding the armature, a direct current source supplying said coil with electric energy and means for periodically changing in said coil the direction of flow of the current supplied by said current source thereby alternately magnetising said armature whereby the one end of the armature next to the air gap is alternately attracted by the one pole or the other pole of the magnet, an induction coil arranged in the magnetic field of said circuit so that an alternating voltage is generated in said coil by the periodically changing magnetic flux, means for producing a translational movement of said armature relative to said air gap in dependence on the displacement to be measured and additional to said oscillating movement so as to additionally vary the magnetic conductivity of the air gap thereby producing modulation of said alternating voltage, a second magnet having confronting pole faces of opposite magnetic polarities separated by a constant air gap, said second air gap being arranged near the other end of said armature so as to be influenced by the oscillation of the armature as the first air gap and to be influenced by the translational movement of the armature in the same degree but in opposite direction as the first air gap, a second induction coil arranged in the magnetic field of said second magnet, an electrical measuring instrument, and connecting means containing said electrical measuring instrument between said two induction coils.

KARL SCHILD.